Nov. 15, 1932.  W. H. SHIFFLER ET AL  1,887,566
PROCESS FOR PRODUCING ALUMINUM CHLORIDE
Filed May 23, 1928
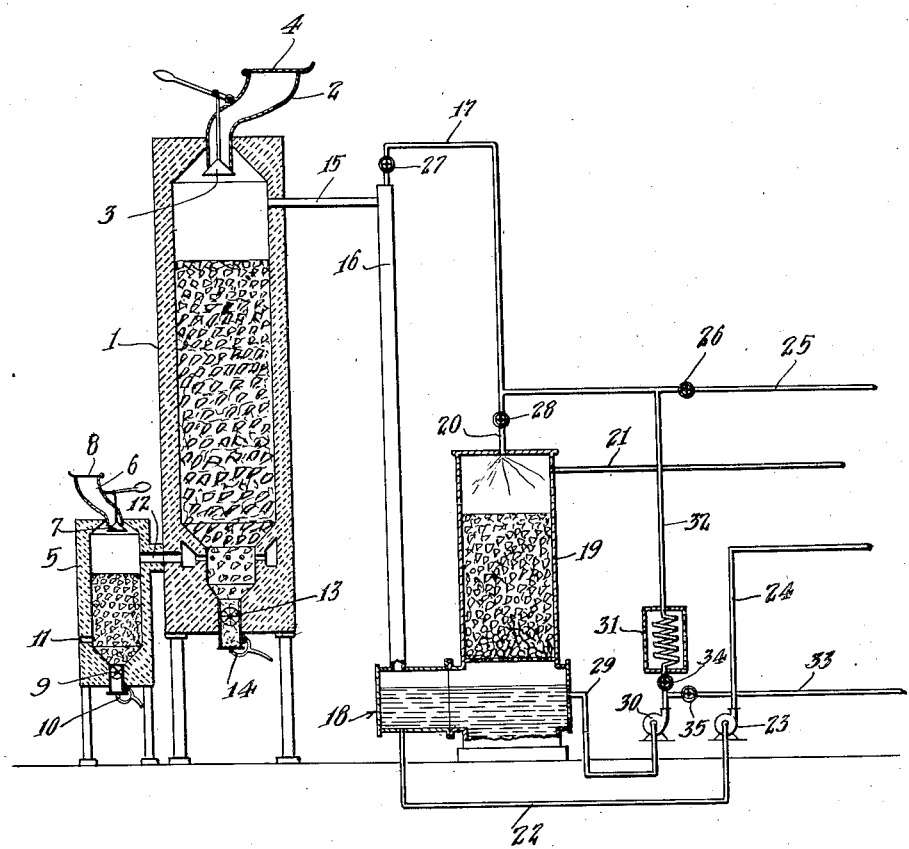
Inventors
William H. Shiffler
Ward P. Anderson
By Lyon & Lyon
Attorneys Patented Nov. 15, 1932

1,887,566

UNITED STATES PATENT OFFICE

WILLIAM H. SHIFFLER AND WARD P. ANDERSON, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

PROCESS FOR PRODUCING ALUMINUM CHLORIDE

Application filed May 23, 1928. Serial No. 279,949.

REISSUED

This invention relates to the production of aluminum chloride or other metallic halide by heating carbonaceous material containing aluminum compounds or other metallic compounds in contact with chlorine gas and in the presence of oxygen.

For purposes of illustration, the process of our invention will be described as relating to the production of aluminum chloride, although it may be also used in the manufacture of other metallic halides. Aluminum chloride is generally manufactured by contacting a coke containing alumina or a mechanical mixture of alumina and carbon at high temperatures with chlorine. Naturally occurring ores, such as bauxite, may be used as the source of alumina and powdered coal or coke or asphalt may supply the carbon for the reaction.

A method and apparatus for producing metallic chlorides from finely divided mixtures of carbonaceous material and metallic compounds has been invented, by John Kuhl and William H. Shiffler and is disclosed in a copending application for patent. The present invention relates to a similar process but is primarily directed to the treatment of coked mixtures of alumina and carbon in comparatively large lumps and discloses a means for producing aluminum chloride (or other metallic halide) more efficiently and economically than other methods and devices in current use. The efficiency and economy of the process is due largely to continuous operation and to the fact that dilute chlorine gases, such as are produced from the well known Deacon process which provides a concentration generally too low for efficient chlorination, may be employed.

An object of this invention is to disclose a continuous process for the production of aluminum chloride from mixtures containing carbon and alumina.

Another object of the invention is to disclose a continuous process of chlorinating alumina-carbon mixtures in the presence of heat.

Another object is to provide a process of treating coke in the form of granules or lumps in counter-current flow to heated gases to produce aluminum chloride in suitable form for use as a treating agent for mineral oils.

A still further object of this invention is to provide a method of chlorinating alumina-carbon mixtures in an efficient and economical manner.

Other objects, results and advantages of our process will become apparent from the following detailed description thereof. For illustrative purposes, one preferred form of apparatus for carrying out this invention is also shown and the advantages resulting from the particular character and arrangement of elements and the apparatus will also become apparent from the subsequent description.

The appended drawing referred to hereinafter illustrates one form of apparatus diagrammatically, the invention not lying in specific details of construction, but in the general arrangement and combination of elements, the details of construction being within the skill of the engineering and mechanical arts.

The raw material upon which the process or method of this invention may be carried out, may be any coke or carbonaceous material containing carbon and alumina or other metallic compounds. Natural bauxite may be coked with asphalt to provide a suitable medium for chlorination and other forms of coke made from alumina and asphaltic or pitchy material may be used if desired.

It has been discovered that any alumina-coke of the above described character may be efficiently and economically chlorinated and treated for the recovery of valuable products by passing the coke through a retort counter-current to the flow of highly heated gases containing chlorine. For example, the alumina-coke may be charged into the top of a vertical retort and a bed of the coke made within the retort while highly heated gases containing chlorine are introduced at the bottom of the retort so that aluminum chloride is produced during the passage of the gases through the mass.

Aluminum chloride thus produced is in the form of vapor, and as such is carried from the top of the retort to suitable recovery means, while the spent coke or ash is withdrawn from the bottom either intermittently or continuously.

The vaporized aluminum chloride together with other gases of the reaction may be scrubbed with oil to condense and absorb the aluminum chloride in the form of a suspension or tar which is suitable for use as a treating agent for mineral oil.

The method provides for the contact of partially reacted and preheated mixture of carbon and alumina with chlorine and air at relatively high temperatures of the latter, thereby allowing the chlorinating reaction to take place progressively and insures a substantially complete conversion of all alumina present in the coke into aluminum chloride.

A novel means of continuously maintaining the required temperature of reaction is also provided, so that none of the carbon in the alumina coke will be utilized in generating the heat, if this saving of carbon in said coke is desired.

The invention hereinbefore described may be more fully understood by reference to the attached drawing which, as has been stated before, illustrates one form of apparatus which may be used in carrying out the broad aspects of our invention.

In the drawing, 1 represents a vertical, internally heated retort of suitable height and size and lined interiorly with a suitable refractory material. The retort 1 is provided with a feeding device 2 for introducing alumina coke of any desired description into the retort.

The feeding device 2 may be provided with double doors 3 and 4 so that coke may be charged into the retort intermittently or it may be fed continuously by a suitable continuous feeder during the reaction taking place within the retort 1, without the escape of vapors therefrom through such coke feeding means.

Highly heated gases are introduced into the lower portion of the retort 1 and they may be heated by means of a separate carbon monoxide gas producer 5 which is charged with a suitable coke such as a fuel coke of low volatile matter content through a feeding device 6 which may also be provided with double doors 7 and 8. The gas producer may also be provided with double clean out doors such as the doors or valved outlets 9 and 10, thereby allowing the removal of ashes intermittently or continuously without the escape of vapors. The gas producer 5 is further provided with an inlet 11 near the bottom of said producer 5 for chlorine gas and air which are discharged from the producer through an outlet 12, leading into the lower portion of the vertical retort 1.

The highly heated gases containing chlorine pass through the bed of the coke containing alumina within the retort 1 and a reaction takes place, resulting in the formation of aluminum chloride in the form of a vapor. Spent coke and ashes resulting from this reaction may be discharged from the vertical retort 1 through double outlet or discharge means 13 and 14.

It will be seen that the coke present in the upper portion of the retort 1 is preheated by the gases and vapors generated in the lower portion of the retort and the highly heated gases introduced into the retort 1 through the inlet 12 first come in contact with the preheated and partially reacted coke. It will be understood that any other means of heating gases such as air and chlorine may be used and the invention is not to be limited to the generation of heat by a combustion of the coke in a separate gas producer. As a matter of fact, some air may be introduced together with the chlorine and carbon monoxide and other gases into the retort 1 and the portion of heat of reaction derived from a partial combustion of coke within the retort 1. The desirability of generating heat by partial combustion of coke within the retort 1 depends somewhat upon the character of the coke being fed to the retort and the proportional quantity of carbon in the coke. For example, if the alumina coke does not contain a large excess of carbon, then it may be desirable to preheat the gases entering the retort in a gas producer as shown.

The aluminum chloride, together with other gases, leaves the retort 1 through a vapor outlet 15 in the upper portion of the retort 1 and these mixed gases are then conducted to a down-take pipe 16 in which they are brought in contact with a spray of cooling and absorbing oil admitted into the upper portion of the down-take pipe 16 by line 17. This cooling oil serves to condense and wash down a portion of the aluminum chloride present in the gases discharged from the retort 1 through pipe means 15 and such oil, together with absorbed or condensed aluminum chloride, is discharged into an oil and tar settling chamber 18. By tar is meant a thick rather viscous suspension which is formed by the absorption of aluminum chloride in an oil.

Gases or components not condensed or absorbed by cooling oil in the downtake pipe 16 then pass from the upper portion of the settling chamber 18 upwardly through a scrubbing tower 19 which may be a packed tower as shown in which a large surface area of contact between the gases and a cooling or absorbing medium is provided. The cooling or absorbing medium may be introduced into the upper portion of the tower 19 through line 20 and discharged into the tower by any suitable spray nozzles or the like. Gases or components not absorbed or condensed within the tower 19 then pass out of the system by line 21 to storage or other treating apparatus, as desired, condensed and absorbed products being carried downward into settling chamber 18.

The lower portion of the settling chamber 18 is provided with an outlet pipe 22 which leads to a pump 23 so that oil containing aluminum chloride may be withdrawn from the lower portion of the settling chamber 18 either intermittently or continuously as desired to storage or for use as a treating agent for mineral oils by various well known aluminum chloride processes, by line 24.

Cooling oil may be introduced into the system by means of line 25 provided with a valve 26. Valves 27 and 28 are provided so as to regulate the amount of cooling oil being introduced into the down-take pipe 16 and scrubbing tower 19 respectively. Cooling oil containing substantially no aluminum chloride may be withdrawn from the upper portion of the settling chamber 18 by means of line 29 which may lead to a pump 30 which, in turn, discharges into a cooler or heat interchanger 31. The cooled oil from the cooler 31 may then be returned by line 32 to line 17 and to the down-take pipe and scrubbing tower.

Excess oil accumulating in the system may be removed therefrom by discharging the oil from the upper portion of the settling chamber 18 by means of line 29 and pump 30 into an outlet line 33, valve 34 being closed and valve 35 in line 33 being open.

The advantages of the above described method and apparatus will be evident to those skilled in the art. Although a method and apparatus have been described with particular reference to an embodiment shown in the drawing, it is to be understood that the invention is not limited thereto, but numerous changes and modifications may be made within the scope of the following claims.

We claim:

1. The method of chlorinating coke containing alumina comprising, introducing a coke containing alumina into a reaction chamber, maintaining a bed of said coke in said reaction chamber, continuously introducing gases containing chlorine and oxygen sufficient to maintain reaction temperature in said reaction chamber, passing said gases through the bed of coke in said chamber, continuously discharging gases and vaporized products of reaction from the upper portion of said chamber, discharging ash and spent coke from the bottom portion of said reaction chamber, and continuously removing condensible products from the gases and vaporized products of reaction.

2. The method of chlorinating coke containing alumina comprising, forming and maintaining a bed of coke containing alumina in a vertical retort, introducing coke containing alumina into the upper portion of said retort, forming a mixture of gases containing chlorine by continuously passing a gas containing chlorine and oxygen through a separate bed of coke, heating said gases to a reaction temperature by combustion of coke in said separate bed, introducing the heated gases containing chlorine into the lower portion of the vertical retort, passing the heated gases upwardly through the bed of coke containing alumina in said retort, and discharging gases and vaporized products of reaction from said retort.

3. A method of chlorinating coke containing alumina, comprising, forming a bed of coke containing alumina in a vertical retort, introducing coke containing alumina into the top of said retort, discharging spent coke from the bottom of said retort, passing chlorine and air through a separate retort containing coke, heating the chlorine by combustion of coke within said separate retort, discharging heated gases containing chlorine from said separate retort into the lower portion of the vertical retort, passing the heated gases upwardly through the bed of coke containing alumina in said retort and discharging gases and vaporized products of reaction from said retort.

Signed at Richmond, Calif., this 12th day of May, 1928.

WILLIAM H. SHIFFLER.
WARD P. ANDERSON.